United States Patent
Wu

(10) Patent No.: US 7,170,721 B2
(45) Date of Patent: Jan. 30, 2007

(54) METHOD OF PRODUCING FLUX GUIDES IN MAGNETIC RECORDING HEADS

(75) Inventor: Andrew L. Wu, Shrewsbury, MA (US)

(73) Assignee: Quantum Corporation, San Jose, CA (US)

( * ) Notice: Subject to any disclaimer, the term of this patent is extended or adjusted under 35 U.S.C. 154(b) by 329 days.

(21) Appl. No.: 10/183,329

(22) Filed: Jun. 25, 2002

(65) Prior Publication Data

US 2003/0235015 A1    Dec. 25, 2003

(51) Int. Cl.
*G11B 5/39* (2006.01)
*G11B 5/31* (2006.01)

(52) U.S. Cl. ..................................... 360/321
(58) Field of Classification Search ................ 360/321, 360/324, 319, 324.1, 324.11, 324.12, 121
See application file for complete search history.

(56) References Cited

U.S. PATENT DOCUMENTS

| | | | |
|---|---|---|---|
| 4,130,847 A | 12/1978 | Head et al. | |
| 5,210,667 A | 5/1993 | Zammit | |
| 5,463,805 A | 11/1995 | Mowry et al. | |
| 5,544,774 A | 8/1996 | Gray | |
| 5,617,273 A | 4/1997 | Carr et al. | |
| 5,666,248 A * | 9/1997 | Gill ......................... | 360/324.1 |
| 5,710,683 A | 1/1998 | Sundaram | |
| 5,772,493 A | 6/1998 | Rottmayer et al. | |
| 5,896,253 A | 4/1999 | Dirne et al. | |
| 5,991,119 A | 11/1999 | Boutaghou et al. | |
| 6,193,584 B1 | 2/2001 | Rudy et al. | |
| 6,205,008 B1 * | 3/2001 | Gijs et al. .................... | 360/324 |
| 6,219,205 B1 | 4/2001 | Yuan et al. | |
| 6,266,217 B1 * | 7/2001 | Ruigrok et al. ............. | 360/320 |
| 6,275,033 B1 * | 8/2001 | Kools .......................... | 324/252 |
| 6,347,983 B1 | 2/2002 | Hao et al. | |
| 6,359,754 B1 | 3/2002 | Riddering et al. | |
| 6,381,106 B1 | 4/2002 | Pinarbasi | |
| 6,396,670 B1 * | 5/2002 | Murdock ..................... | 360/319 |
| 6,433,965 B1 | 8/2002 | Gopinathan et al. | |
| 6,438,026 B2 * | 8/2002 | Gillies et al. ................ | 365/158 |
| 6,669,787 B2 * | 12/2003 | Gillies et al. ................ | 148/277 |
| 6,678,126 B2 * | 1/2004 | Katakura et al. ........... | 360/321 |

(Continued)

FOREIGN PATENT DOCUMENTS

EP    497403 A1 *  8/1992

(Continued)

OTHER PUBLICATIONS

Bhushan, B. et al. (Apr. 15, 1996). "Pole Tip Recession Studies of Hard Carbon-Coated Thin-Film Tape Heads," *J. Appl. Phys.* 79(8):5916-5918.

(Continued)

*Primary Examiner*—William J Klimowicz
(74) *Attorney, Agent, or Firm*—Morrison & Foerster LLP

(57) ABSTRACT

A flux guide protected magnetoresistive sensor in a tape drive read/write head is presented. The magnetoresistive sensor has a tape bearing surface, and includes a magnetoresistive sensing element and a flux guide disposed on a surface of the magnetoresistive sensing element to form a portion of the tape bearing surface.

27 Claims, 10 Drawing Sheets

U.S. PATENT DOCUMENTS

| | | | |
|---|---|---|---|
| 6,765,770 B2 * | 7/2004 | Dee | 360/324.12 |
| 2001/0026470 A1 * | 10/2001 | Gillies et al. | 365/158 |
| 2001/0040777 A1 * | 11/2001 | Watanabe et al. | 360/321 |
| 2002/0012204 A1 | 1/2002 | Boutaghou et al. | |
| 2002/0024880 A1 | 2/2002 | Mao et al. | |
| 2002/0034661 A1 * | 3/2002 | Gillies et al. | 428/692 |
| 2002/0053129 A1 | 5/2002 | Watanuki | |
| 2002/0118493 A1 * | 8/2002 | Kondo et al. | 360/321 |
| 2002/0191348 A1 * | 12/2002 | Hasegawa et al. | 360/314 |
| 2003/0002230 A1 * | 1/2003 | Dee et al. | 360/324.12 |
| 2003/0002232 A1 * | 1/2003 | Dee | 360/324.12 |
| 2003/0072110 A1 * | 4/2003 | Dee | 360/324.12 |
| 2003/0200041 A1 | 10/2003 | Church et al. | |
| 2003/0206383 A1 * | 11/2003 | Meguro et al. | 360/324.12 |
| 2004/0032696 A1 | 2/2004 | Johnson et al. | |

FOREIGN PATENT DOCUMENTS

| | | | |
|---|---|---|---|
| EP | 498492 A1 * | | 8/1992 |
| EP | 519558 A1 * | | 12/1992 |
| EP | 1 176 585 A2 | | 1/2002 |
| EP | 1 376 543 A2 | | 1/2004 |
| GB | 2169434 A * | | 7/1986 |
| JP | 62075924 A * | | 4/1987 |
| JP | 05266425 A * | | 10/1993 |
| JP | 07153036 A * | | 6/1995 |
| JP | 07230610 A * | | 8/1995 |
| JP | 08153310 A * | | 6/1996 |
| JP | 11-120523 A | | 4/1999 |
| JP | 2001291214 A * | | 10/2001 |

OTHER PUBLICATIONS

European Search Report issued Jun. 30, 2005, for European Patent Application No. 03253992.6, four pages.

Patton, S.T. et al. (1996). "Micromechanical and Tribological Characterization of Alternate Pole Tip Materials for Magnetic Recording Heads," *Wear* 202(1):99-109.

* cited by examiner

METHOD OF PRODUCING FLUX GUIDES IN MAGNETIC RECORDING HEADS

BACKGROUND

The invention relates generally to data storage systems and, more specifically, to data storage systems having read heads which employ magnetoresistive sensors.

As storage density increases, the magnetic field being sensed during read by a magnetoresistive sensor in a read head of a data storage system becomes smaller. Thus, there is an ongoing desire to provide improved sensitivity of reads.

One way to improve the performance of a read head is to replace conventional anisotropic magnetoresistive (AMR) sensors with giant magnetoresistive (GMR) sensors, as GMR sensors provide a greater response to a magnetic field in comparison to AMR sensors. The GMR or "spin valve" sensor is characterized by a magnetoresistive (MR) coefficient that is substantially higher than the MR coefficient of an AMR sensor. A GMR sensor is typically a sandwiched structure consisting of two ferromagnetic layers separated by a thin non-ferromagnetic layer. One of the ferromagnetic layers is called the "pinned layer" because it is magnetically pinned or oriented in a fixed and unchanging direction by an adjacent anti-ferromagnetic layer, commonly referred to as the "pinning layer," through anti-ferromagnetic exchange coupling. The other ferromagnetic layer is called the "free" or "unpinned" layer because the magnetization is allowed to rotate in response to the presence of external magnetic fields. When a sense current is applied to the sensor in the presence of a magnetic field such as that provided by magnetic storage medium, the resistance of the GMR sensor changes resulting in a change in voltage due to the applied sense current. This voltage change may be measured and used to read back information. A GMR sensor fabricated from the appropriate materials provides improved sensitivity and greater change in resistance than observed in AMR sensors. Thus, GMR sensors have become the preferred type of magnetoresistive sensor for data storage systems such as magnetic disk and tape drives.

Certain materials in the GMR sensor that are exposed on the head surface (also known as the air bearing surface or "ABS" with respect to disk drive heads, and the tape bearing surface or "TBS" with respect to tape drive heads) are quite prone to corrosion, making heads which utilize GMR sensors extremely sensitive to corrosion in the environments in which they are expected to operate. Disk drive heads, which operate in an environment sealed at the factory in clean room conditions, are less susceptible to corrosion than tape drive heads, which must operate while exposed to an often quite harsh ambient atmosphere. Also, typically the ABS of the disk drive head is coated with a thin protective film, which is hard and wear resistant on the air bearing surface of a disk drive head. Unfortunately, the nature of tape recording makes the protective overcoat a poor solution for tape drive heads. Tape recording always involves contact between the tape and head, and the surface of the tape is more abrasive than that of a disk. Consequently, the protective film wears off in an unacceptable amount of time.

SUMMARY

In one aspect of the invention, a magnetoresistive sensor in a tape drive read head having a tape bearing surface includes a magnetoresistive sensing element and a flux guide disposed on a surface of the magnetoresistive sensing element to form a portion of the tape bearing surface.

Embodiments of the invention may include one or more of the following features.

The magnetoresistive sensing element can be GMR element, or an AMR element.

The GMR element can include a spacer layer, an antiferromagnetic exchange layer and a pinned layer, and the flux guide can cover the surface of the GMR element to the extent that the flux guide prevents exposure of the spacer, antiferromagnetic exchange and pinned layers on the tape bearing surface.

The flux guide can be made of a permeable material, and the permeable material an be a nickel-iron alloy.

In another aspect of the invention, a tape drive head includes a write portion and a read portion, the read head portion including a magnetoresistive sensor having a tape bearing surface. The magnetoresistive sensor includes a magnetoresistive sensing element and a flux guide disposed on a surface of the magnetoresistive sensing element to form a portion of the tape bearing surface of the magnetoresistive sensor.

In yet another aspect of the invention, a tape drive includes a magnetic tape, a read head to read information recorded on the magnetic tape and a magnetoresistive sensor in the read head. The magnetoresistive sensor has a tape bearing surface, and includes a magnetoresistive sensing element and a flux guide disposed on a surface of the magnetoresistive sensing element to form a portion of the tape bearing surface of the magnetoresistive sensor.

In yet another aspect of the invention, a method of manufacturing a thin film read head includes providing a GMR film to a surface of a read gap insulating layer and processing the GMR film to produce a GMR sensing element having a flux guide disposed thereon, the flux guide forming a portion of a tape bearing surface of the thin film read head.

Particular implementations of the invention may provide one or more of the following advantages. The flux guide allows GMR sensors to be used in tape drive heads without the corrosion prone materials such as Cu, and to a lesser degree, CoFe and the AFM exhange materials, being exposed on the TBS. It also allows the GMR element stripe height to be defined by high precision photolithographic techniques as opposed to the less controllable mechanical lapping that is typically used in the manufacture of GMR sensors. The flux guide can be made of a high permeability material such as nickel iron (NiFe) flux, thus providing for the easy conduction of flux to the GMR sensors. In addition, because the flux guide is maintained in a single domain (i.e., there are no domain wall motions), flux can conduct more freely.

Other features and advantages of the invention will be apparent from the following detailed description, and from the claims.

DETAILED DESCRIPTION

Figure 1:
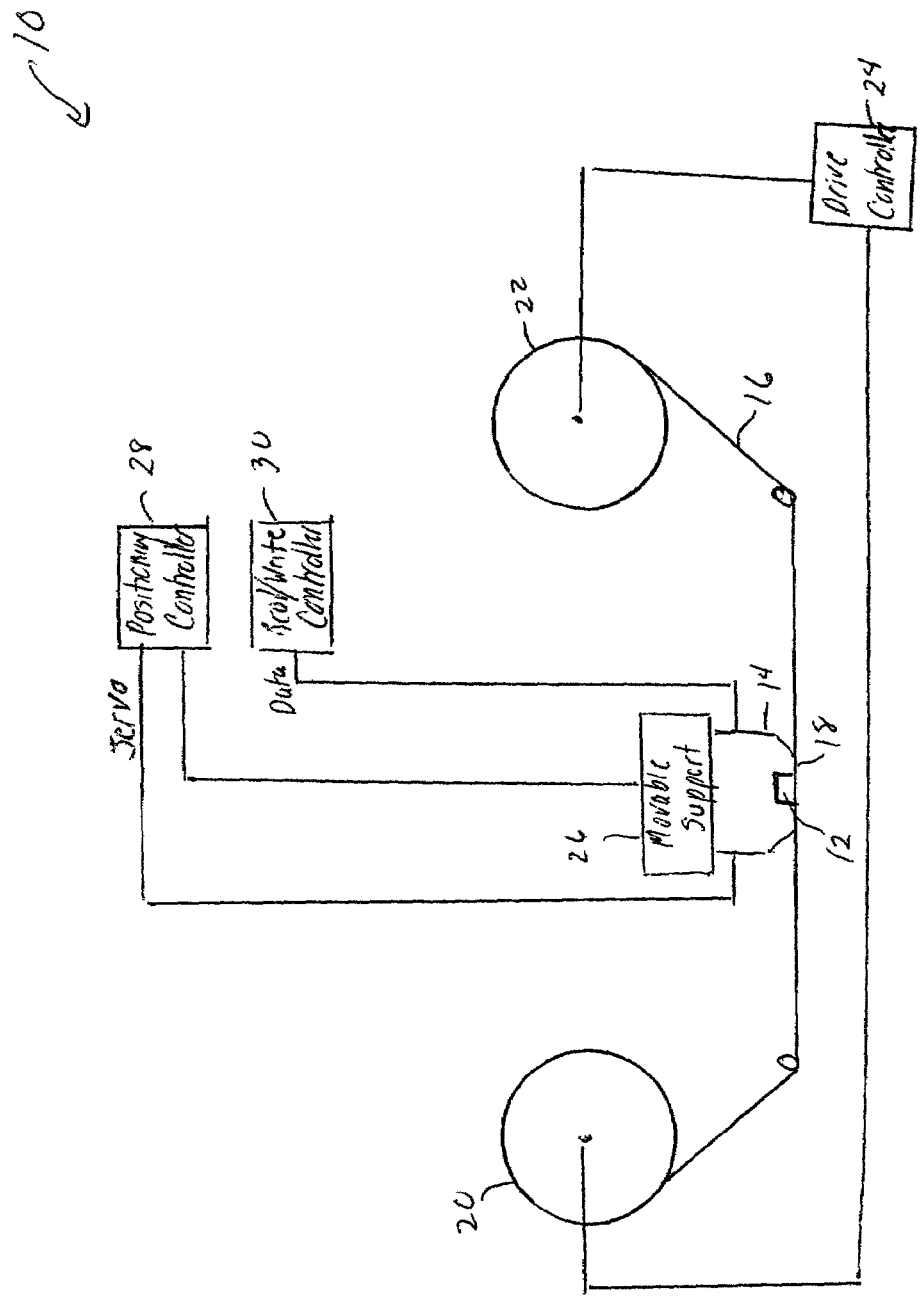
FIG. 1 is simplified diagram of a magnetic tape drive system having a thin film read/write head.

Referring to FIG. 1, a magnetic tape drive system 10 includes a read/write head 12 that is mounted on a support 14. A magnetic tape 16 is moved linearly past a planar "tape bearing surface" (or "TBS") 18 of the support 14 and head 12 in either a forward or reverse direction by a pair of reels 20 and 22. A drive controller 24 controls the rotation of the reels 20 and 22 in the forward and reverse directions.

The support 14 is mounted on a movable support 26, which moves transverse to the magnetic tape 16 so that the head 12 can read and write magnetic information signals on the longitudinally moving tape 16. The head 12 can read servo information on the tape so as to keep the head 12 within a desired track. The head 12 provides the servo information to a position controller 28, which processes the servo information and provides head movement signals to the movable support 26. Further, the head 12 is connected to a read/write controller 30, which processes data read from the tape by the head 12 and provides write data to the head 12 for recording on the tape 16.

Figure 2:
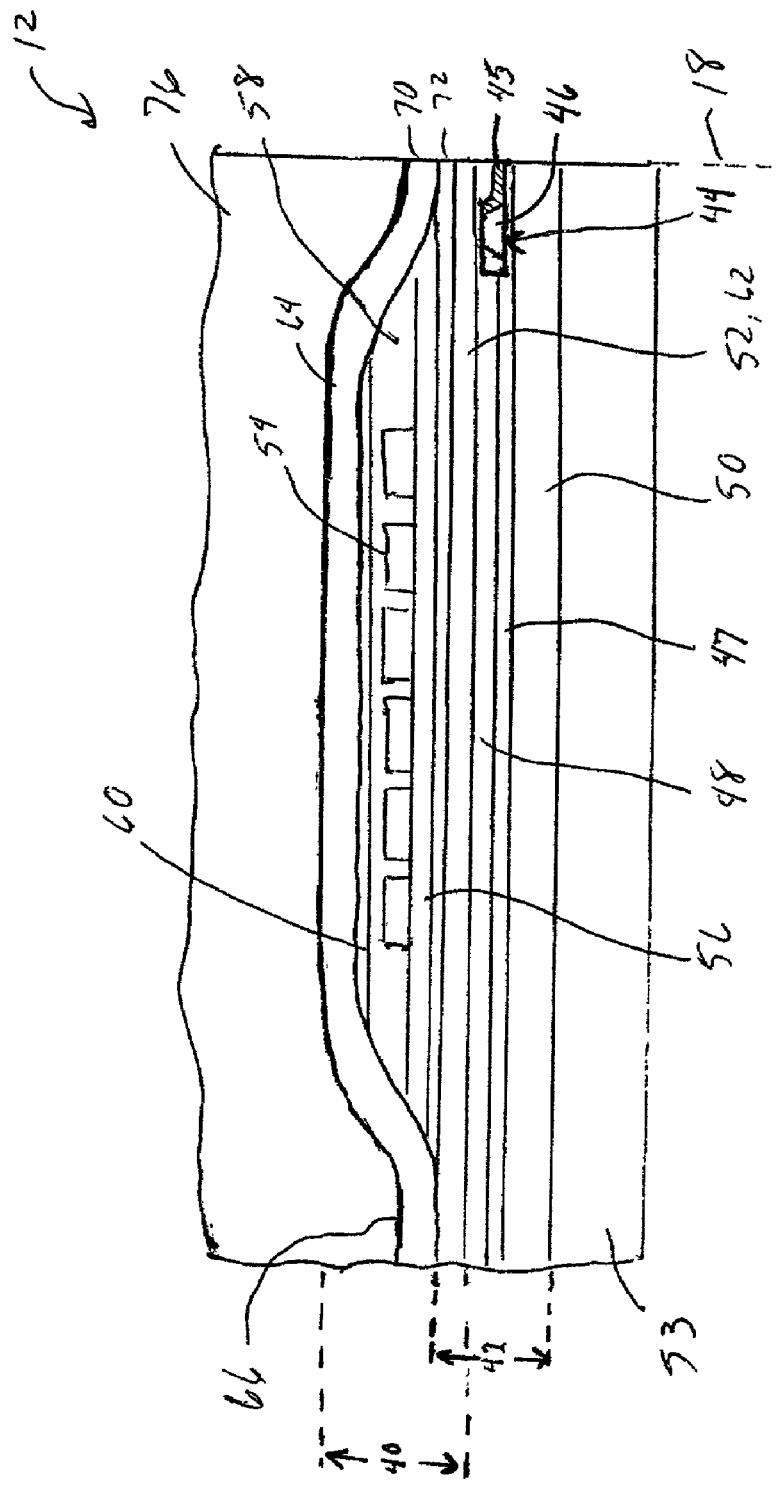
FIG. 2 is a cross-sectional side view of the read/write head shown in FIG. 1.

FIG. 2 is a side cross-sectional view of the head 12 which has a write head portion 40 and a read head portion 42. The read head portion 42 employs a magnetoresistive (MR) type sensor 44. In one embodiment, the MR sensor is a giant magnetoresistive (GMR) sensor. The sensor 44 includes a flux guide 45 disposed on a side surface of a GMR element 46 between the GMR element 46 and the tape bearing surface 18, thus forming part of the tape bearing surface 18, as shown. The flux guide 45 helps conduct magnetic flux from the tape 16 during read operations and, in the case of MR-type sensor elements such as the GMR element 46 that have a high sensitivity to corrosion, provides corrosion protection to such elements, as will be described in further detail below with reference to FIGS. 6–9.

Figure 3:
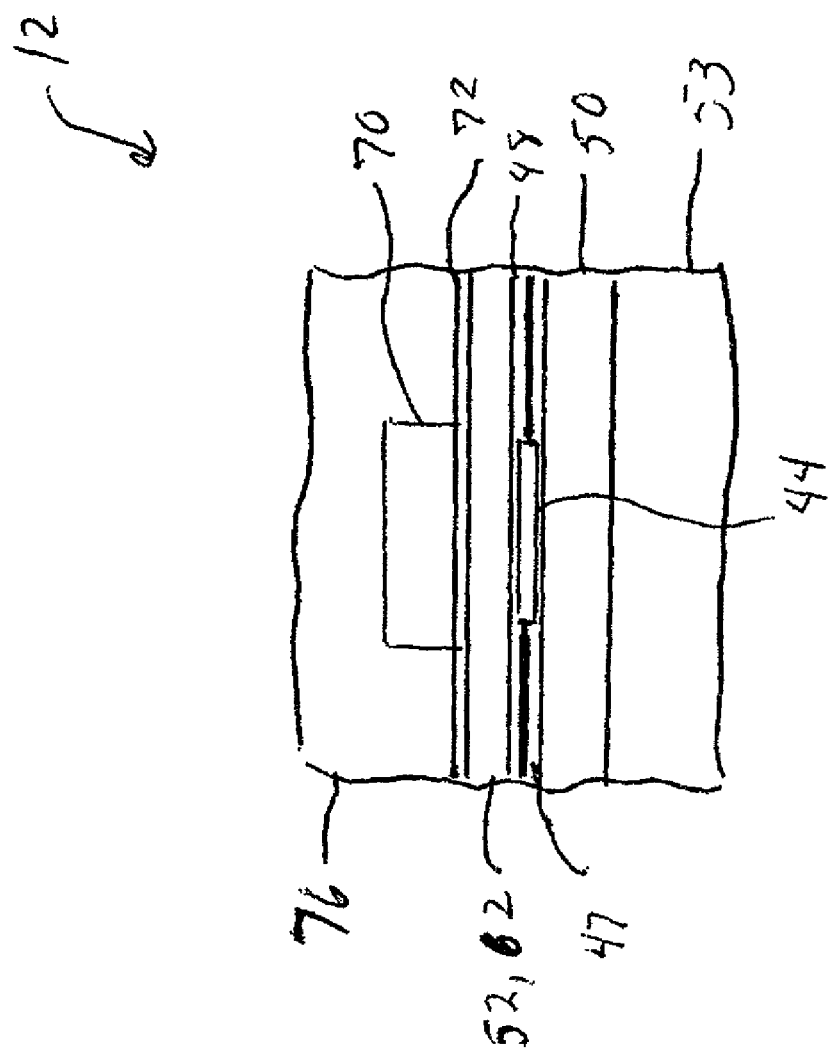
FIG. 3 is a tape bearing surface view of a magnetoresistive (MR) sensor in a read portion of the read/write head.

FIG. 3 is a tape bearing surface view of FIG. 2. Referring to FIGS. 2 and 3, the MR sensor 44 is sandwiched between bottom and top read gap layers 47 and 48 and the read gap layers are sandwiched between bottom and top shield layers 50 and 52. On the other side of the bottom shield layer 50 is an undercoat layer 53 (which is formed on a substrate, not shown). In response to external magnetic fields, the resistance of the MR sensor 44 changes. A sense current conducted through the MR sensor 44 causes these resistance changes to be manifested as voltage changes. The voltage changes are then processed by the data control 30 shown in FIG. 1.

The write head portion 40 includes a coil layer 54 sandwiched between first and second insulation layers 56 and 58. A third insulation layer 60 may be employed for planarizing the read/write head 12 to eliminate ripples in the second insulation layer 58 caused by the coil layer 54. The first, second and third insulation layers are referred to in the art as an "insulation stack". The coil layer 54 and the first, second and third insulation layers 56, 58 and 60 are sandwiched between bottom and top pole piece layers 62 and 64. The bottom and top pole piece layers 62 and 64 are magnetically coupled at a back gap 66. The top pole piece layer 64 has a top pole tip 70, which is separated from the bottom pole piece layer 62 by a write gap layer 72 at the head tape bearing surface 18. Above the top pole piece layer 64 is an overcoat layer 76.

It will be appreciated that, while the illustrated embodiment is a merged head in which a single ferromagnetic layer functions as a second shield layer of the read head and as the first pole piece layer of the write head, the second shield layer and the first pole piece layer could be separate layers.

Figure 4:
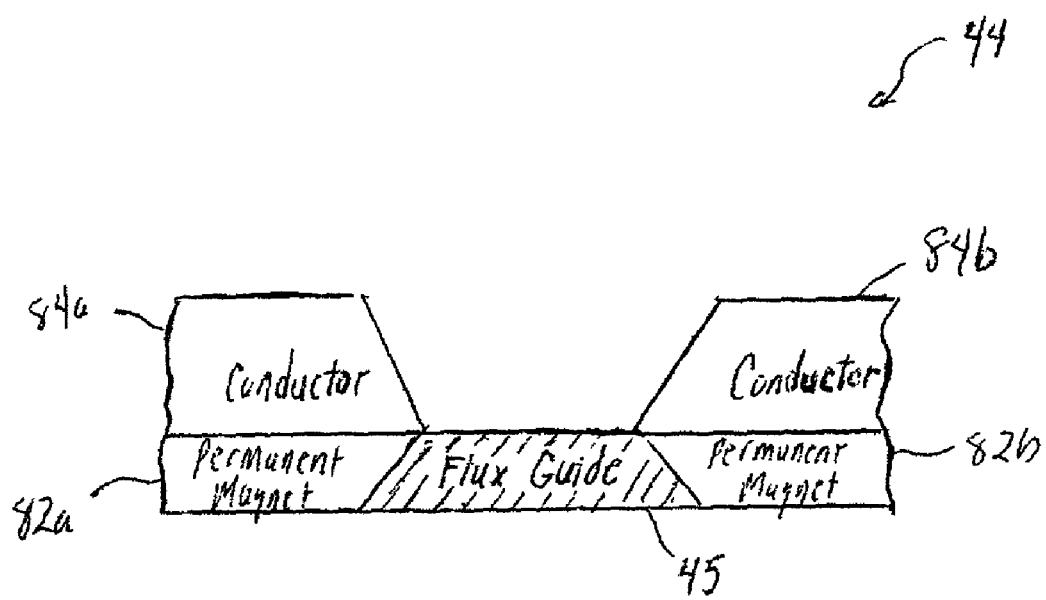
FIG. 4 is tape bearing surface view of the MR sensor (from FIGS. 2 and 3), which includes a flux guide to protect an MR element (not shown), as well as permanent magnets.

Referring to FIG. 4, the GMR sensor 44, viewed again from the tape bearing surface, is shown in further detail. It includes the flux guide 45 and the GMR element 46 (which is covered by the flux guide 45 and therefore not visible in this view). The GMR sensor 44 also includes permanent magnets 82a and 82b, as well as conductors 84a and 84b. Typically, permanent magnets, which form abutted junctions with the sensing element 46, are used to suppress Barkhausen noises and to maintain a single domain state (that is, prevent formation of domain walls) in the sensing element 46. The permanent magnets 82a, 82b also form abutted junctions with the flux guide 45 to provide a single domain state in the flux guide, allowing the magnetic flux from the medium to be conducted through the flux guide freely without domain wall motions. The read head portion of the head structure of FIGS. 2–4 can be fabricated in the following manner. The bottom shield layer 50 is made of a magnetic material and is formed on the insulating layer 53, which is made of alumina and is deposited on a substrate (not shown). On the bottom shield layer 50, alumina or aluminum nitride, for example, is deposited to form the bottom read gap layer 47 as an insulating layer. On the bottom read gap layer 47, a GMR film is deposited for making the GMR element 46. The GMR element 46 is formed via a sequence of photoresist patterning, etching, sputtering and lift-off operations, as will be later described. The top read gap layer 48 is formed as an insulating layer on the bottom read gap layer 47 and the GMR element 46. The top shield layer 52/bottom pole 62 is formed on the top read gap layer 48. The top shield layer is made of a magnetic material and used for both the read and write head portions of the head 12.

Figure 5:
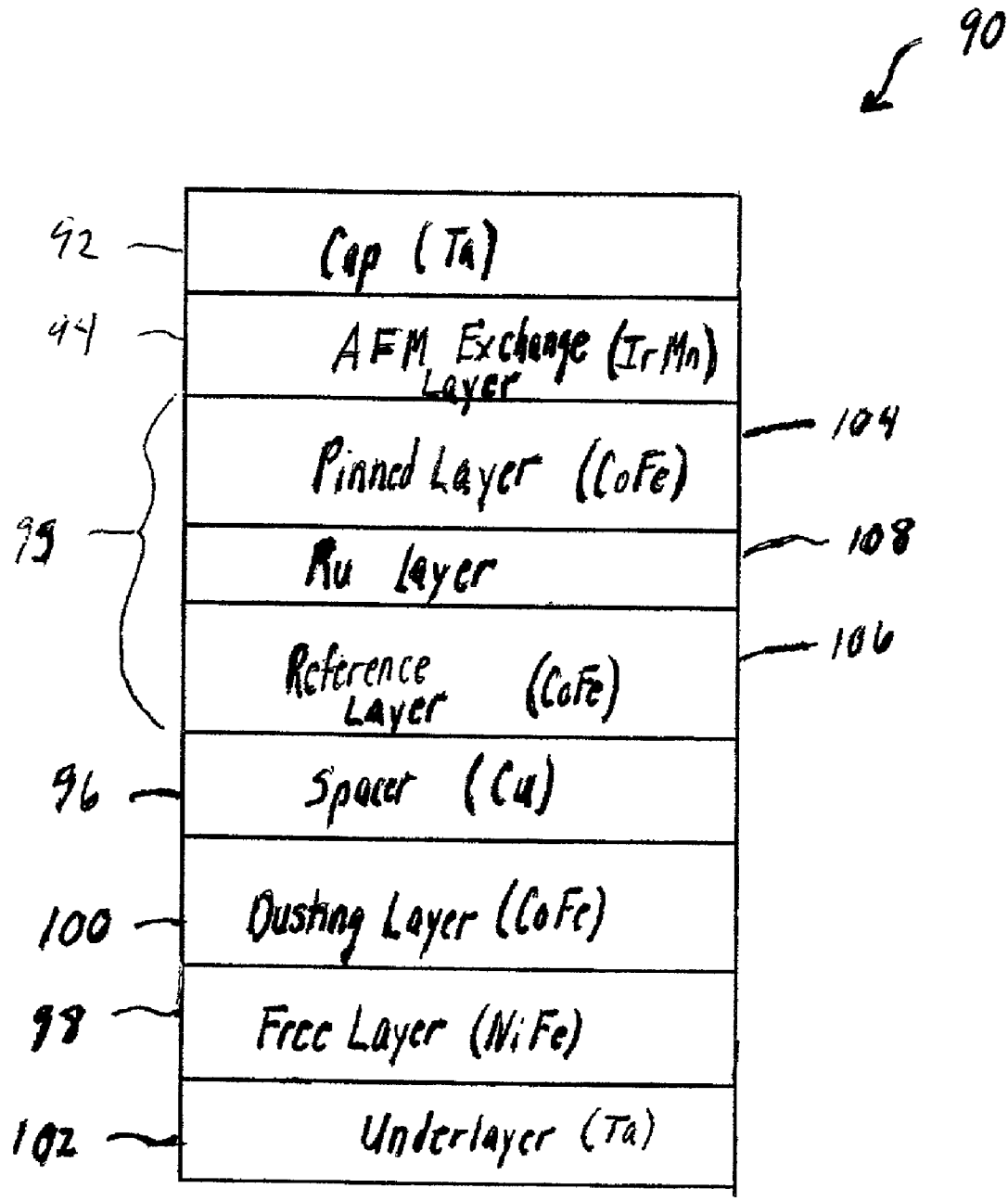
FIG. 5 is a tape bearing surface view of an exemplary GMR film stack.

FIG. 5 shows a representative GMR multilayer stack 90 of the GMR element 46. The structure includes a cap layer 92, typically made of tantalum (Ta), a pinning or antiferromagnetic (AFM) exchange layer 94 of a suitable conductive material such as IrMn, which functions to magnetically pin a ferromagnetic ("pinned") layer 95. A spacer layer 96, typically made of a suitable transition metal such as copper (Cu) is located adjacent to the pinned layer 95. A free magnetic layer is positioned adjacent to the other side of spacer layer 96. The free layer can be a single layer made of NiFe, or multiple layers, including a free layer 98, typically made of NiFe, and a dusting layer 100 (typically made of cobalt-iron) between the free layer 98 and the spacer 96, as shown. Adjacent to the other side of the free layer 98 is a buffer or underlayer 102, typically made of Ta like the cap layer 92. Optionally, and as shown, the pinned layer 95 can be implemented as a "synthetic antiferromagnetic" (SAF) pinned layer, which includes two opposed pinned layers of CoFe, shown as pinned layer 104 and reference layer 106 spaced apart by a layer of ruthenium (Ru).

A sensing current provided from a tape drive current source and carried in a current path through the conductor 84a and permanent magnet 82a flows in the plane of the GMR stack elements and exits the stack via a current path through the permanent magnet 82b and conductor 84b to produce operation in a current-in-the-plane (CIP) mode.

It should be understood that the spin valve may be either a top or a bottom type spin valve, as later illustrated in FIGS. 9A and 9B. In a bottom spin the exchange layer is constructed before the construction of the remainder of the layers of the spin valve. In a top spin valve, the free layer, the spacer layer and the pinned layer are constructed first and the pinning layer is constructed on top of the pinned layer for pinning its magnetic moment.

Although the MR sensor 44 has been illustrated as a GMR sensor, it may be any one of a plurality of MR-type sensors, including, but not limited to, top or bottom spin valve GMR, AMR, SAF GMR and spin tunneling. Also, although the described embodiment is a GMR sensor utilizing a spin valve structure operating in a CIP mode, it will be understood that a spin valve GMR sensor operating in a current-perpendicular-to-the-plane (CPP) mode could be used.

Figure 6:
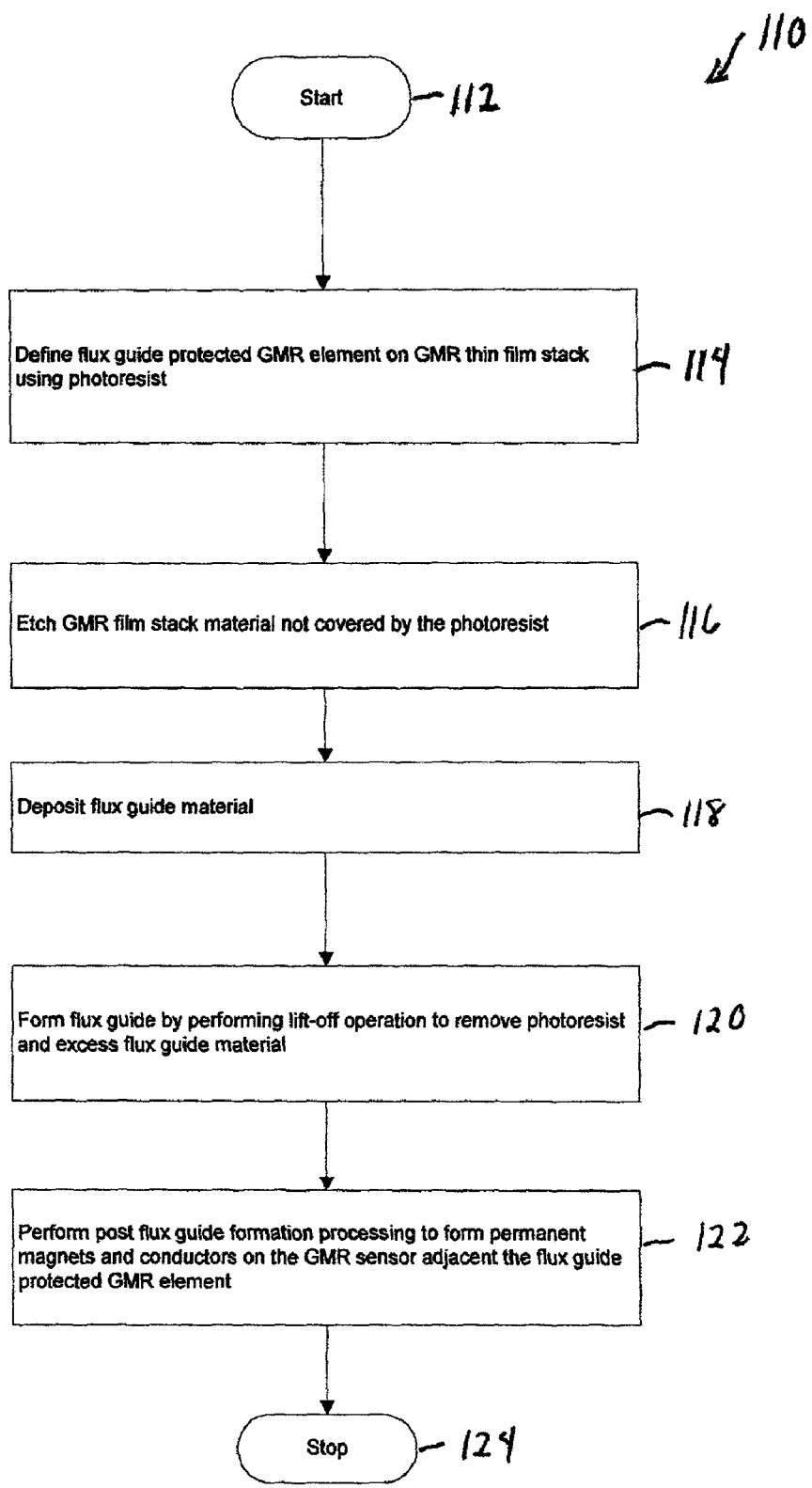
FIG. 6 is a flow diagram of a process for fabricating a GMR sensor with flux guide.

Referring to FIG. 6, an exemplary process 110 of fabricating the sensor 44 of FIG. 4 begins (step 112) after a film of the GMR stack (an example of which is shown in FIG. 5) is deposited on the lower read gap layer. The process 110 includes patterning or defining the flux guide protected GMR element 46 on the GMR thin film by applying a suitable photoresist to the film (step 114) so that it covers all regions where no flux guide material is desired, and removing the exposed stack material not covered by the photoresist using an etch process, preferably an ion milling operation (step 116). In an alternative embodiment, the process 110 can use end point detection to stop the etch at a point that is partially (e.g., halfway) through the underlayer 102. The process 110 further includes depositing flux guide material, preferably NiFe or other materials capable of providing good flux conduction (step 118), and forming the flux guide by lift-off of the photoresist (step 120). After the lift-off operation, the structure is further processed in a known manner to create the permanent magnets and conductors (step 122). As noted earlier, the permanent magnets provide single domain states in GMR element as well as the flux guide. The single domain state in the flux guide allows the magnetic flux from the medium to be conducted through the flux guide freely without domain wall motions, hence resulting in high permeability.

Figure 7A:
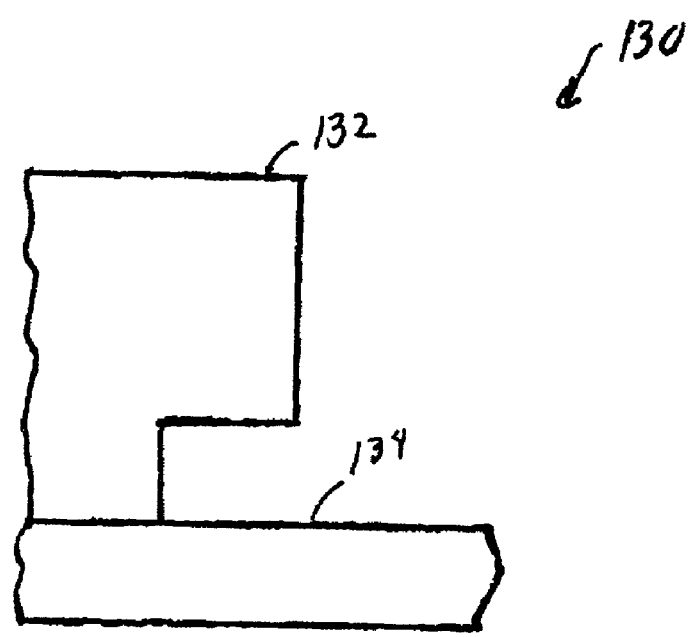
FIGS. 7A–7D are cross-sectional views depicting the structure of the GMR element at various stages of the process of FIG. 6.
Figure 7B:
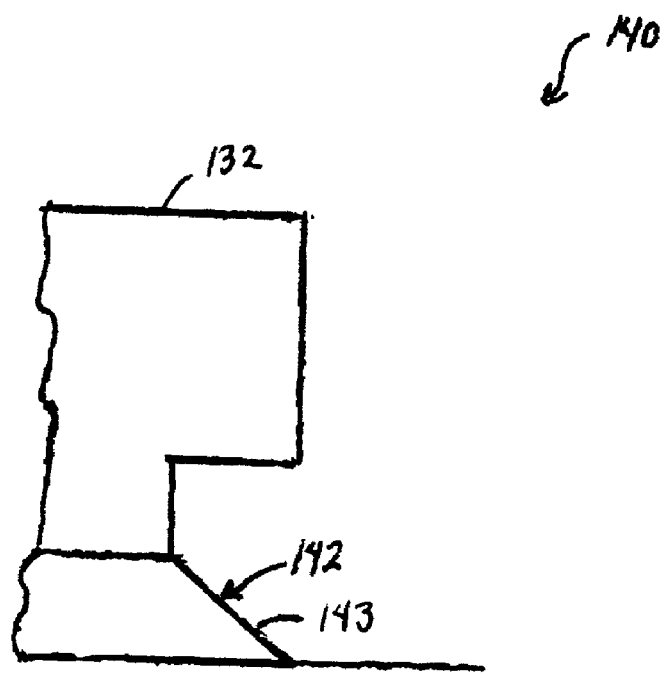

FIGS. 7A–7D illustrate the GMR sensor at various stages of the fabrication process. Referring to FIG. 7A, a structure 130 (partial view) corresponding to process step 114 shows a photoresist 132 for patterning the GMR element positioned on the top surface of the GMR film 134. Referring to FIG. 7B, a structure 140 (partial view) corresponding to step 116 shows a GMR element structure 142 resulting from the etching of the film 134. The GMR element structure 142 is formed by using ion milling to etch away the undesired portions of the film stack. Ion milling is of a process well known in the art. During the ion milling, portions of the film stack, located outward from the photoresist 132, are etched away. The ion beam is directed at an angle (typically about 5 degree from the vertical) relative to the normal of the plane of the film stack. In this manner, portions of the film stack fall within the shadow of the photoresist and the film stack is etched with a sloping side 143, as shown.

In the manufacture of conventional GMR sensors, the tape bearing surface of the GMR film is not etched but instead lapped to achieve a desired GMR element stripe height. It is critical to accurately control the size of the GMR element during the lapping process since the performance of a GMR sensor is dependent on the stripe height of its sensing element. Because mechanical lapping processes have substantial manufacturing tolerances associated with them, however, it is extremely difficult to accurately control the stripe height during the lapping process. In contrast, the process 114, through the use of an appropriately dimensioned photoresist, allows the stripe dimension to be controlled with greater precision than is possible with lapping processes.

Figure 7C:
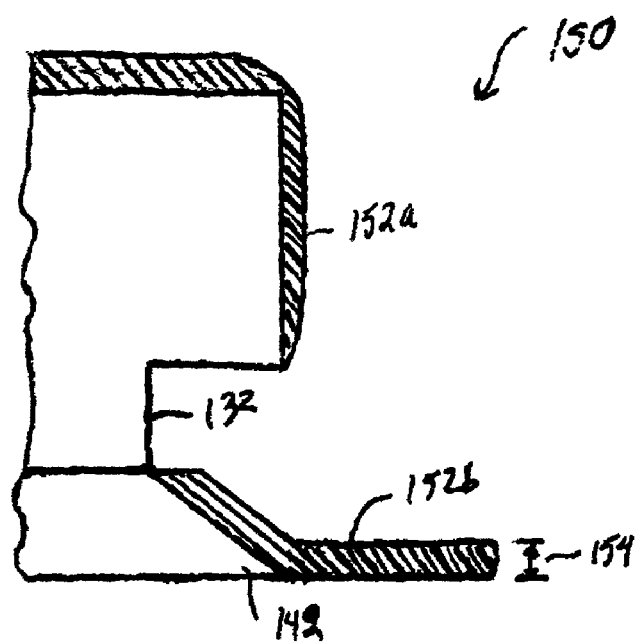

Referring to FIG. 7C, a partial view of a structure 150 corresponding to process step 118 shows flux guide material deposited in the top and side surfaces of the photoresist 132, flux guide material 152a, as well as the tape bearing surface side 143, flux guide material 152b. The flux guide material is deposited to a thickness 154. A thinner flux guide is preferred, as a thicker flux guide is expected to have more current shunting, thus resulting in less current through the NiFe sensor material and, therefore, lower output signals.

Figure 7D:
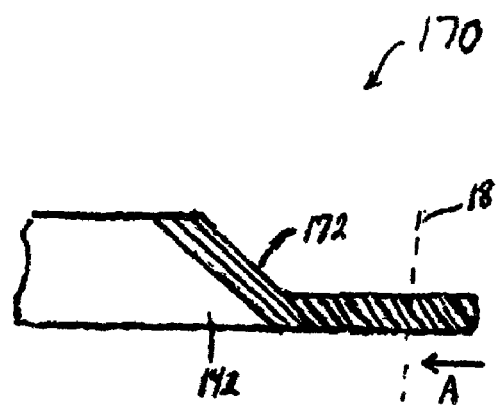

Referring to FIG. 7D, a structure 170 (shown in partial view) resulting from the process step 120, and using the deposition thickness illustrated in FIG. 7C, is shown. The photoresist and excess material deposited on the photoresist have been removed, leaving only a flux guide structure 172 and the GMR element structure 142. It will be appreciated that the structure 170 is further processed, e.g., the flux guide structure 172 is lapped (in the direction of arrow "A") to the tape bearing surface 18, thus forming the flux guide 45, and the GMR element structure 142 is further processed to produce the GMR element 44

Figure 8:
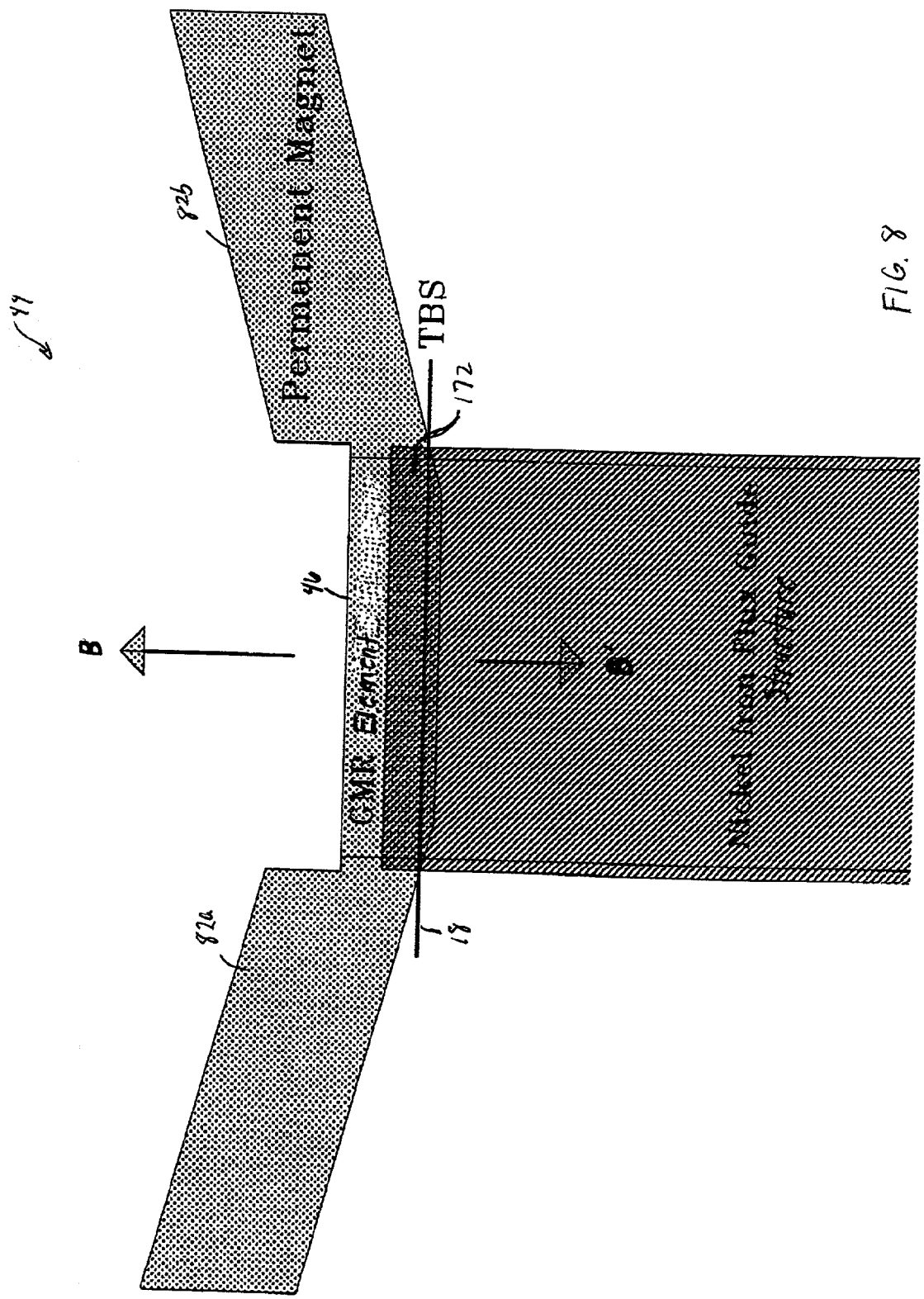
FIG. 8 is a top view of the GMR sensor after formation of the flux guide and permanent magnets.

FIG. 8 is a top view of the GMR sensor 44, and thus a top view of the GMR element 46 and the flux guide structure 172, that is, the flux guide 45 prior to lapping. Also shown are the permanent magnets 82a and 82b. The conductor layers 84a, 84b, shown in FIG. 4, are omitted in this view.

Figure 9A:
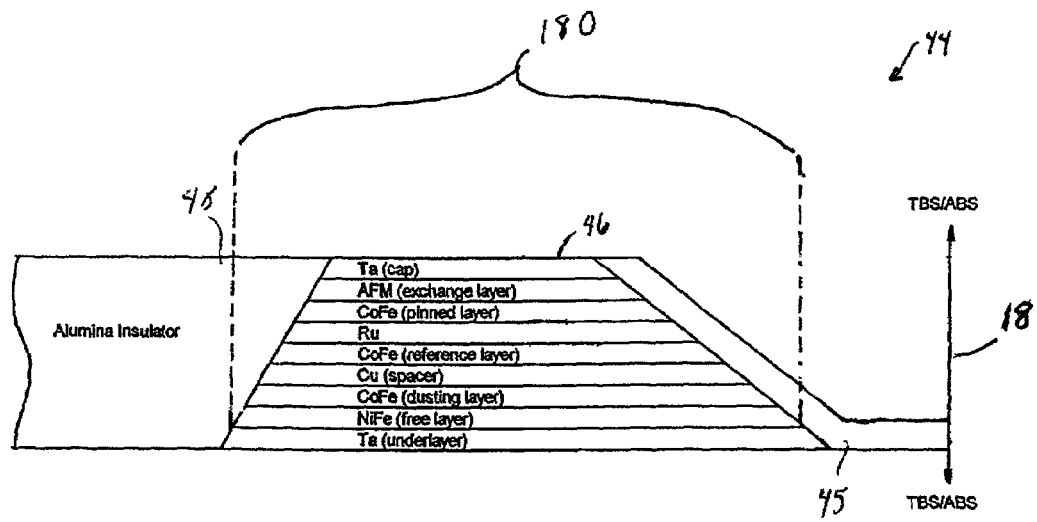
FIGS. 9A and 9B show a cross-sectional view, taken along line B–B' shown in FIG. 8, of a top spin-valve GMR sensor with flux guide and a bottom spin-valve GMR sensor with flux guide, respectively.
Figure 9B:
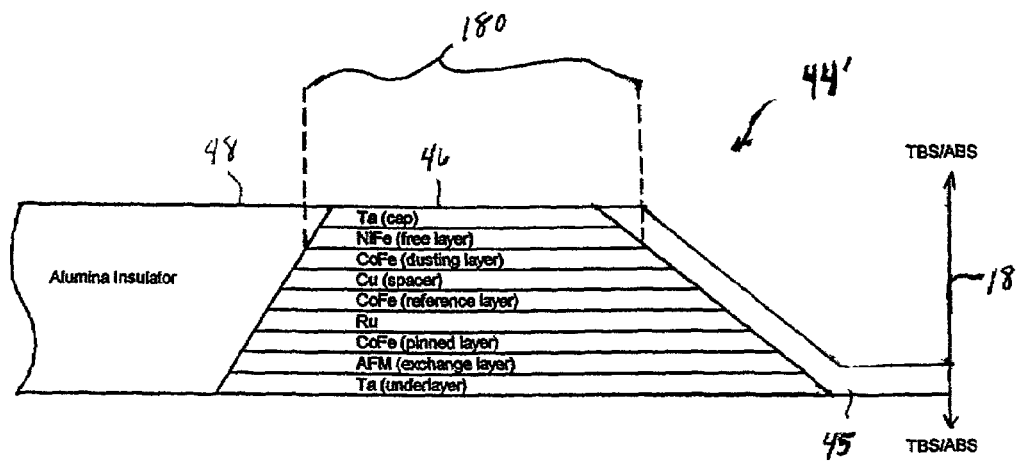

FIGS. 9A and 9B show a top spin valve GMR sensor 44 and a bottom spin valve sensor 44' in a cross-sectional side view taken along the line B–B' of FIG. 8. The flux guide 45 forms a portion of the tape bearing surface 18 and thus isolates the corrosion prone materials such as Cu, CoFe and the AFM exchange layer materials of the GMR element 46 from corrosive materials typically encountered on the tape bearing surface in contact with the magnetic tape. The GMR element stripe height, indicated by the reference numeral 180, is the NiFe height defined by the back side of the flux guide 45 (side bordering the front side of the GMR element 46) and the back side of the GMR element abutting the alumina insulator 48.

Other embodiments are within the scope of the following claims.

What is claimed is:
1. A magnetoresistive sensor in a tape drive read head having a tape bearing surface, comprising:
    a magnetoresistive sensing element; and
    a flux guide disposed on a surface of the magnetoresistive sensing element to form a portion of the tape bearing surface,
    wherein the surface is sloped with respect to the normal of the plane of the magnetoresistive sensing element, and
    wherein the flux guide maintains a single domain state, and the flux guide is disposed on the same level as, and in physical contact with, the magnetoresistive sensing element.

2. The magnetoresistive sensor of claim 1 wherein the magnetoresistive sensing element comprises a giant magnetoresistive (GMR) element.

3. The magnetoresistive sensor of claim 2 wherein the GMR element comprises a bottom spin valve GMR element.

4. The magnetoresistive sensor of claim 2 wherein the GMR element comprises a top spin valve GMR element.

5. The magnetoresistive sensor of claim 2 wherein the GMR element includes a synthetic antiferromagnetic layer.

6. The magnetoresistive sensor of claim 2 wherein the GMR element includes a spacer layer, an antiferromagnetic exchange layer and a pinned layer, and wherein the flux guide covers the surface of the GMR element to the extent that the flux guide prevents exposure of the spacer, antiferromagnetic exchange and pinned layers on the tape bearing surface.

7. The magnetoresistive sensor of claim 1 wherein the flux guide comprises a permeable material.

8. The magnetoresistive sensor of claim 7 wherein the permeable material comprises a nickel-iron alloy.

9. The magnetoresistive sensor of claim 1 wherein the magnetoresistive sensing element comprises an anisotropic magnetoresistive (AMR) element.

10. The magnetoresistive sensor of claim 1, wherein the magnetoresistive sensing element maintains a single domain state.

11. A head for use in a tape drive, comprising:
a write head portion; and
a read head portion, the read head portion including a magnetoresistive sensor having a tape bearing surface;
the magnetoresistive sensor comprising a magnetoresistive sensing element and a flux guide disposed on a surface of the magnetoresistive sensing element to form a portion of the tape bearing surface of the magnetoresistive sensor,
wherein the surface is sloped with respect to the normal of the plane of the magnetoresistive sensing element, and
wherein the flux guide maintains a single domain state, and the flux guide is disposed on the same level as, and in physical contact with, the magnetoresistive sensing element.

12. The head of claim 11 wherein the magnetoresistive sensing element comprises a giant magnetoresistive (GMR) element.

13. The head of claim 12 wherein the GMR element comprises a bottom spin valve GMR element.

14. The head of claim 12 wherein the GMR element comprises a top spin valve GMR element.

15. The head of claim 12 wherein the GMR element includes a synthetic antiferromagnetic layer.

16. The head of claim 12 wherein the GMR element includes a spacer layer, an antiferromagnetic exchange layer and a pinned layer, and wherein the flux guide covers the surface of the GMR element to the extent that the flux guide prevents exposure of the spacer, antiferromagnetic exchange and pinned layers on the tape bearing surface.

17. The head of claim 11 wherein the flux guide comprises a permeable material.

18. The head of claim 17 wherein the permeable material comprises a nickel-iron alloy.

19. The head of claim 11 wherein the magnetoresistive sensing element comprises an anisotropic magnetoresistive (AMR) element.

20. The head of claim 11, wherein the magnetoresistive sensing element maintains a single domain state.

21. A tape drive comprising:
a magnetic tape;
a read head to read information recorded on a magnetic tape;
a magnetoresistive sensor in the read head, the magnetoresistive sensor having a tape bearing surface; and
the magnetoresistive sensor comprising a magnetoresistive sensing element and a flux guide disposed on a surface of the magnetoresistive sensing element to form a portion of the tape bearing surface of the magnetoresistive sensor,
wherein the surface is sloped with respect to the normal of the plane of the magnetoresistive sensing element, and
wherein the flux guide maintains a single domain state, and the flux guide is disposed on the same level as, and in physical contact with, the magnetoresistive sensing element.

22. The tape drive of claim 21 wherein the magnetoresistive sensor is a GMR element.

23. The tape drive of claim 22 wherein the GMR element includes a spacer layer, an antiferromagnetic exchange layer and a pinned layer, and wherein the flux guide covers the surface of the GMR element to the extent that the flux guide prevents exposure of the spacer, antiferromagnetic exchange and pinned layers on the tape bearing surface.

24. The tape drive of claim 21, wherein the magnetoresistive sensing element maintains a single domain state.

25. A method of manufacturing a thin film read head comprising:
providing a GMR film to a surface of a read gap insulating layer;
processing the GMR film to produce a GMR sensing element having a flux guide disposed thereon, the flux guide forming a portion of a tape bearing surface of the thin film read head,
wherein the surface is sloped with respect to the normal of the plane of the magnetoresistive sensing element, and
wherein the flux guide maintains a single domain state, and the flux guide is disposed on the same level as, and in physical contact with, the magnetoresistive sensing element.

26. The method of claim 25 wherein the flux guide comprises a nickel-iron alloy material.

27. The method of claim 25, wherein the GMR sensing element maintains a single domain state.

* * * * *